United States Patent [19]

Melman et al.

[11] 3,758,054

[45] Sept. 11, 1973

[54] MULTI-POSITION AIRCRAFT HOLDBACK CLEAT

[75] Inventors: Nathan Melman, Levittown, Pa.; John P. Malriat, Pennsauken, N.J.

[73] Assignee: The United States of America as represented by the Secretary of the Navy, Washington, D.C.

[22] Filed: Mar. 24, 1972

[21] Appl. No.: 237,839

[52] U.S. Cl. .............................................. 244/115
[51] Int. Cl. ............................................. B64f 1/12
[58] Field of Search ................... 244/115, 63, 114 R; 114/218

[56] References Cited
UNITED STATES PATENTS
3,370,811    2/1968   Boody .................................. 244/63
3,456,910    7/1969   Cody et al ......................... 244/114 R

*Primary Examiner*—Milton Buchler
*Assistant Examiner*—Paul E. Sauberer
*Attorney*—R. S. Sciascia, A. W. Collins et al.

[57]    ABSTRACT

The present disclosure relates to novel and improved apparatus for restraining an aircraft from a catapult assisted take-off until a predetermined required launching force is developed. The improved aircraft restraining or holdback apparatus includes a multi-position cleat assembly inset in the aircraft launching surface, a frangible holdback assembly which is secured at one end to the aircraft and which engages the cleat assembly at its other end, and means for directing the holdback assembly away from the launching area when the launch is initiated.

7 Claims, 3 Drawing Figures

MULTI-POSITION AIRCRAFT HOLDBACK CLEAT

When an aircraft is to be launched from the flight deck of a carrier or from another confined take-off area, it is customary to supplement the launching force of the aircraft engine with that of a suitable catapult device. Moreover, in order to be certain that a satisfactory launch will be effected, it is also customary to restrain movement of the aircraft from its take-off run until a predetermined adequate launching force is developed. This is normally accomplished by means of a suitable aircraft holdback device that includes a tension bar that shears when the predetermined necessary launching force is exceeded. When the tension bar shears and the launch is initiated, the ruptured holdback device often fouls the gear which is employed to retract the catapult shuttle for another launch.

It is therefore a principal object of the invention to provide novel and improved apparatus to assure satisfactory removal of the ruptured holdback device from the aircraft launching area when a launch is effected.

It is a further object of the invention to provide a novel and improved cleat assembly inset in the launching surface which secures one end of the aircraft holdback device prior to the launch and which directs the holdback device upwardly and rearwardly away from the launch area when the launch is initiated.

Other objects and many of the attendant advantages of this invention will be readily appreciated as the same becomes better understood by reference to the following detailed description when considered in connection with the accompanying drawing wherein.

Figures 1, 2:
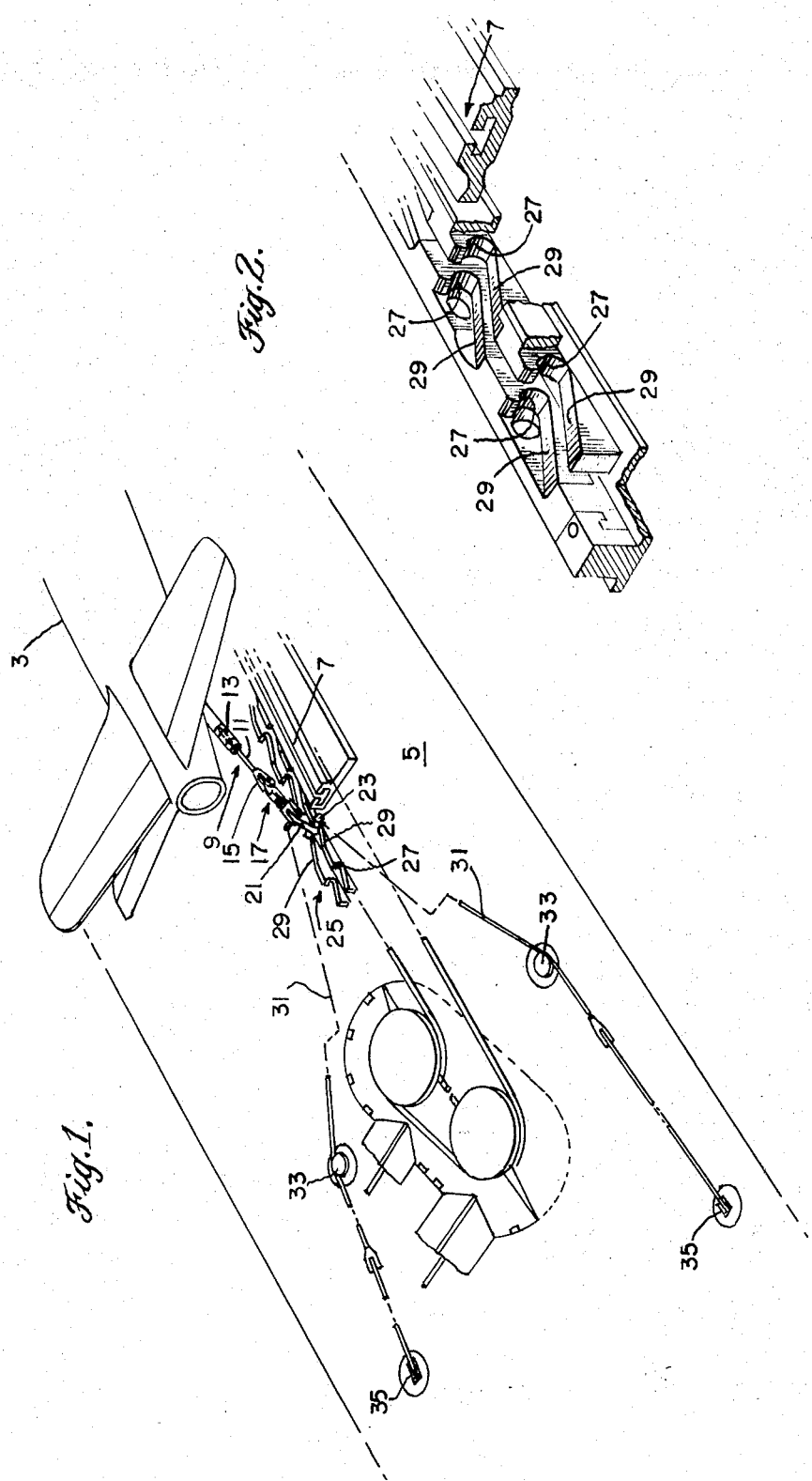
FIG. 1 is a perspective view of a preferred embodiment of the invention with a portion of launching surface cut away.
FIG. 2 is an enlarged detailed view of the cleat assembly shown in FIG. 1.
Figure 3:
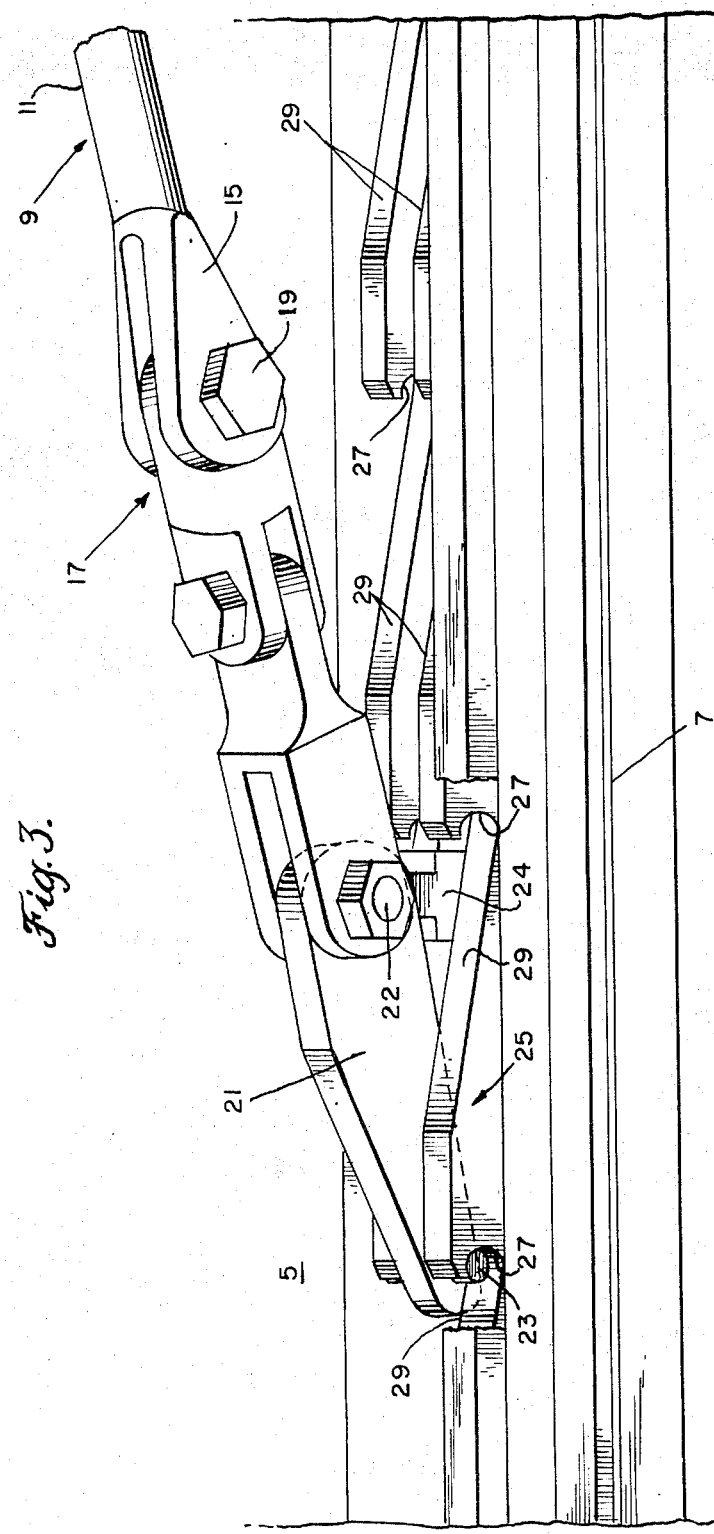
FIG. 3 is an enlarged perspective view of the cleat-holdback cable interconnection of the invention.

Referring now to the various figures of the drawing, it will be noted that the aircraft 3 is shown ready for a launch from the flight deck of an aircraft carrier or other suitable take-off or launching surface 5. The launching force is transmitted from a conventional catapult device to the aircraft 3 through a catapult shuttle that traverses the slot in the guide rail 7, through a launching bridle and through an aircraft tow hook not shown in the drawing.

Until the required launching force is developed, the aircraft 3 is restrained from its launch by the aircraft holdback apparatus 9. The aircraft holdback apparatus 9 includes the cable or bar 11 which is secured at one end in any suitable manner to the aircraft 3 through a shear pin or the like 13. The bifurcated terminal 15 of the other end of cable 13 is connected to one end of the cable universal assembly 17 by the pin or bolt 19. The bifurcated other end of the universal assembly 17 is connected to one end of the bell crank link 21 by the pin or bolt 22. The other end of the link 21 includes the integral trunnions 23 which are adapted to engage the cleat assembly 25 inset in the launching surface 5 in a manner which will be more apparent hereinafter. The T-shaped foot 24 which projects downwardly from the said one end of the link 21 engages the upper surface of the cleat assembly 25 and maintains the link in a suitable attitude during the pre-launch aircraft restraining operation.

The cleat assembly 25 is anchored in the carrier flight deck or other launching surface 5 adjacent the launching end of the shuttle guide rail 7 of the aircraft catapult device in any suitable manner. The cleat assembly 25 includes a series of semi-cylindrical trunnion bearing surfaces 27 inset therein and ramps 29 that extend upwardly and rearwardly from the bottom of each trunnion bearing surface. The trunnion surfaces 27 and the ramps 29 may be formed as separate component parts of the cleat assembly and secured thereto in any suitable manner or they may be cast in one piece with the assembly without departing from the spirit or scope of the invention. The material of which the ramps 29 are preferably constructed is a ductile iron or other suitable energy absorbing material which is used to avoid a rebound of the ruptured cable assembly 9 against the underside of the aircraft 3. The elastic cables ar cords 31, which as will be more apparent hereinafter, insure retraction of the severed holdback assembly 9 when the launch is initiated, are preferably secured at one end to the bell crank link 21 and extend rearwardly about the pulley mechanisms 33 to a suitable anchoring point 35 on the launching surface 5.

In operation, when the aircraft 3 is to be restrained until sufficient power is developed to assure a successful launch, the cable assembly 9 is secured at one end to the aircraft and the trunnions 23 of the bell crank link 21 are positioned in one of the trunnion bearing surfaces 27 of the cleat assembly 25. The universal device 17 permits movement of the trunnioned end of the cable assembly 9 so as to facilitate its ready engagement in one of the trunnion bearing surfaces 27 of the cleat assembly 25. When a sufficient take-off power is developed to launch the aircraft 3, the pin 13 in the cable assembly 9 shears and the strain energy developed in the cable holdback assembly 9 and/or the energy of the tensioned elastic cables 31 direct the ruptured cable assembly 9 rearwardly and up the ramps 29 clear of the shuttle return path of the catapult.

It is to be understood that, although the aircraft holdback device is described herein as including a cable assembly, any other conventional holdback bar or device could be used without departing from the spirit or scope of the invention.

Obviously, many modifications and variations of the present invention are possible in the light of the above teachings. It is therefore to be understood that within the scope of the appended claims, the invention may be practiced otherwise than as specifically described.

What is claimed is:

1. Apparatus for preliminarily restraining an aircraft during a launching operation, said apparatus comprising:
   a. a cleat assembly secured in the aircraft launching surface, said cleat assembly including a trunnion bearing surface and a ramp which extends upwardly and rearwardly from the bottom of the trunnion bearing surface; and
   b. a frangible holdback assembly which is secured at one end to the aircraft and which engages the cleat assembly at its other end when the aircraft is to be preliminarily restrained during the launching operation.

2. The apparatus substantially as described in claim 1 wherein the cleat assembly is positioned adjacent and parallel to the launching end of the shuttle guide rail of an aircraft catapult device.

3. The apparatus substantially as described in claim 1 wherein the cleat assembly includes a plurality of trunnion bearing surfaces and ramps in tandem.

4. The apparatus substantially as described in claim 1 and further including at least one elastic member which extends between the said other end of the holdback assembly and the launching surface and which is in tension during the launching operation.

5. The apparatus substantially as described in claim 1 wherein the said other end of the holdback assembly includes a pair of trunnions which are adapted to engage the cleat assembly.

6. The apparatus substantially as described in claim 1 wherein the holdback assembly includes a universal element.

7. The apparatus substantially as described in claim 1 wherein the ramp is constructed from an energy absorbing material.

* * * * *